2,805,211

POLYMER OF A VINYL AROMATIC COMPOUND WITH A PETROLEUM HYDROCARBON POLYMER

Stanford J. Hetzel, Cheltenham, Pa., assignor to Sun Oil Company, Philadelphia, Pa., a corporation of New Jersey No Drawing. Application August 16, 1954, Serial No. 450,260

13 Claims. (Cl. 260—41)

This invention relates to resinous materials and more particularly to a polymerization product of a monovinyl aromatic compound with a petroleum hydrocarbon polymer obtained by treatment of cracked gasoline with clay.

The novel resinous materials prepared according to the present invention are useful in coating compositions such as varnishes, paints, etc. A particularly useful composition containing the polymerization product according to the invention is an aluminum paint containing aluminum powder in addition to the polymerization product.

Varnishes prepared from the polymerization products according to the invention have highly satisfactory properties such as drying time, film clarity, etc., and in some respects such varnishes are superior to varnishes prepared from such conventional materials as linseed oil.

Aluminum paint compositions prepared according to the invention have highly satisfactory properties such as drying time, color of finish and firmness of finish. In these respects aluminum paints prepared according to the invention are generally superior to aluminum paints prepared with the hydrocarbon polymer itself, i. e. not incorporated in a polymer of a vinyl aromatic compound.

The petroleum hydrocarbon polymer employed according to the present invention is a well-known product obtained in the treatment of cracked gasoline with clay. Such treatment and the conditions employed therein are well known in the art. The hydrocarbon polymer obtained in such treatment is generally recognized as being obtained by polymerization of olefinic compounds contained in the cracked gasoline. The polymer is essentially cyclic in character and contains generally aromatic rings and also non-aromatic rings. Generally the polymer contains at least one aromatic ring per molecule, and not more than 5 aromatic rings per molecule. Also the polymer generally contains at least one non-aromatic ring and not more than 5 non-aromatic rings per molecule. Generally the polymer will contain at least one olefinic double bond per molecule, and will not contain more than 5 olefinic double bonds per molecule.

The hydrocarbon polymer employed according to the invention preferably has bromine number within the approximate range from 50 to 135. Particularly preferred polymers for use according to the invention are those having bromine number within the approximate range from 60 to 120. The specific gravity of the hydrocarbon polymer at 60° F. is preferably within the range from 0.935 to 0.98, and the Saybolt viscosity of the polymer at 210° F. is preferably within the range from 10 to 80. The average molecular weight of the hydrocarbon polymer is preferably within the approximate range from 200 to 600.

The composition and properties of hydrocarbon polymer employed according to the invention vary considerably with the conditions of the clay treatment and the extent to which the polymer obtained is separated from more volatile constituents of the products of clay treatment. Suitable clay treating conditions, polymer separation conditions, and polymer composition and properties include those disclosed in U. S. Patent 2,194,439, issued March 19, 1940, to Martin B. Chittick, and in U. S. Patent 2,008,102, issued July 16, 1935, to Julius Hyman.

Monovinyl aromatic compounds in general are satisfactory for polymerization with the indicated petroleum hydrocarbon polymer to obtain the polymerization product according to the invention. Preferred monovinyl aromatic compounds are those having the following formula:

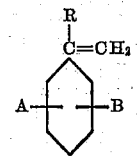

where R is hydrogen, methyl, or ethyl, A is hydrogen or halogen or an alkyl radical having not more than three carbon atoms, and B is hydrogen or halogen or an alkyl radical having not more than three carbon atoms. Examples of suitable monovinyl aromatic compounds are styrene, o-methyl styrene, p-methyl styrene, o-ethyl styrene, p-ethyl styrene, o,p-dimethyl styrene, o,p-diethyl styrene, p-chlorostyrene, m-chlorostyrene, o-methyl-p-chlorostyrene, o-ethyl-p-chlorostyrene, o-methyl-p-isopropyl styrene, alpha-methyl styrene, p-methyl styrene, m-chloro-alpha-methyl styrene, p-chloro-alpha-methyl styrene, p-isopropyl-alpha-methyl styrene, m-chloro-p-methyl-alpha-methyl styrene, mixtures of monovinyl aromatic compounds, etc.

The polymerization is carried out by subjecting a mixture of the hydrocarbon polymer and the monovinyl aromatic compound to conditions for polymerizing the monovinyl aromatic compound in a non-aqueous medium. For example the mixture can be maintained at an elevated temperature, preferably at least 150° C., for preferably at least an hour, in the presence of a polymerization catalyst such as ditertiary butyl peroxide, benzoyl peroxide, hydrogen peroxide, tertiary butyl hydroperoxide, acetyl benzoyl peroxide, tertiary butyl perbenzoate, etc. Other polymerization methods can also be employed to prepare the polymerization products according to the invention.

Preferably the amounts of vinyl aromatic compound and of hydrocarbon polymer which are employed in the polymerization process are such that 5 to 95 parts by weight of vinyl aromatic compounds are polymerized with 5 to 95 parts of the hydrocarbon polymer.

Varnish compounds prepared according to the invention generally contain the polymerization product, a drier, and a solvent. The amount of drier employed is preferably within the approximate range from 0.1 to 2.0 parts by weight per 100 parts of the polymerization product. In the case of a metal soap drier, the amount of metal is preferably within the approximate range from 0.01 to 0.5 part by weight per 100 parts of the polymerization product. The amount of solvent employed for a particular varnish can readily be chosen by a person skilled in the art. Any suitable drier can be employed, preferably one of the metal soap type. Also any known solvent can be employed, preferably a hydrocarbon solvent.

Aluminum paint compositions according to the invention generally contain aluminum powder, in addition to the constituents mentioned with regard to the varnish compositions. The amounts of aluminum powder, drier, and solvent employed for a particular varnish can readily be chosen by a person skilled in the art.

The following examples illustrate the invention:

*Example I*

Vinyl toluene (o-methyl styrene) was polymerized with a hydrocarbon polymer obtained by treatment of cracked gasoline with clay. The latter polymer was a commercial product typically having the following properties: specific gravity at 60° F. of 0.9554, Saybolt viscosity at 100° F. of 250–300 seconds, Saybolt viscosity at 210° F. of 45 seconds, API gravity 15.8, average molecular weight 400–480, bromine number 80–100, flash point 195° F., fire point 205° F., pour point −35° F., iodine number 220, and initial boiling point 190° C. The polymer typically contained an average of about 3 olefinic double bonds per molecule, about 2–4 aromatic rings per molecule, and about 3 non-aromatic rings per molecule.

50 parts by weight of hydrocarbon polymer, 50 parts of vinyl toluene, and 1.2 parts of tertiary butyl hydroperoxide as catalyst were mixed and stirred at 180° C. for a 2 hour period. The temperature was then increased to 240° C. for an additional 2 hours. The reaction product was diluted with 25 parts of petroleum spirits.

A varnish was prepared from 25 parts of the diluted polymerization product by the addition of 0.1 part of cobalt naphthenate containing 6% cobalt as drier and 25 parts of petroleum spirits as solvent. The varnish contained about 19.8 parts of polymerization product, 14.95 parts of solvent, and 0.1 part of drier. The varnish was applied to freshly sanded plywood. A tack-free dry was obtained in 25 minutes, and a hard dry was obtained in 4 hours; a clear film was obtained.

By way of comparison a polymerization product of linseed oil and vinyl toluene was prepared in the same manner, substituting linseed oil for the hydrocarbon polymer. A varnish was prepared in the same manner from the polymerization product of linseed oil and vinyl toluene. The following table shows a comparison of the results obtained:

|  | Hydrocarbon Polymer Varnish | Linseed Oil Varnish |
| --- | --- | --- |
| Dry Tack-free, Minutes | 25 | 90. |
| Hard dry, hours | 4 | 6. |
| Film clarity | Clear | Clear. |

This example shows that a highly satisfactory varnish can be prepared from a polymerization product of vinyl toluene with hydrocarbon polymer obtained by treatment of cracked gasoline with clay, and that the varnish so prepared is faster drying then one prepared from a polymerization product of linseed oil and vinyl toluene.

*Example II*

An aluminum paint was prepared from a polymerization product of vinyl toluene and hydrocarbon polymer, the product having been prepared in a manner similar to that described in Example I. The composition of the aluminum paint was as follows:

| | Parts by weight |
| --- | --- |
| Polymerization product | 37.85 |
| Petroleum spirits | 47.31 |
| Xylene | 37.85 |
| Aluminum powder | 9.08 |
| Cobalt naphthenate | 0.25 |

These constituents were mixed together with mechanical agitation to obtain the aluminum paint. The paint was applied to freshly sanded plywood and also to strips of bright tin. For purposes of comparison another aluminum paint was prepared having the same composition except that the original hydrocarbon polymer was substituted for the vinyl toluene polymerization product. The latter paint was also applied to freshly sanded plywood and bright tin. The following table shows the comparison of the results obtained:

| | Vinyl Toluene Polymerization Product | | Hydrocarbon Polymer | |
| --- | --- | --- | --- | --- |
| | Wood | Tin | Wood | Tin |
| Dry tack-free, minutes | 29 | 55 | >60 | >60. |
| Hard dry, hours | 1 | 1 | >2 | >2 |
| Condition of finish | Firm | Firm | Powdery | Slightly powdery. |

The color of the finish was lighter in the case of the polymerization product than in the case of the hydrocarbon polymer. This example shows that polymerization of vinyl toluene with a hydrocarbon polymer obtained by treatment of cracked gasoline with clay produces a product which is substantially superior for use in aluminum paints to the original hydrocarbon polymer from which it was prepared. Thus more rapid drying is obtained, and also a superior finish.

*Example III*

Styrene was polymerized with a hydrocarbon polymer obtained by treatment of cracked gasoline with clay. The properties of the latter polymer were essentially the same as those given in Example I. 50 grams of hydrocarbon polymer, 25 grams of styrene, 250 mm. of xylene and 1 gram of benzoyl peroxide were refluxed for 24 hours. Xylene was stripped from the products to obtain a soft, resinous, solid residue which was immobile at room temperature and very tacky. This product was generally similar in properties to the product obtained in Example I by polymerization of vinyl toluene and hydrocarbon polymer from treatment of cracked gasoline with clay.

In another run, 50 grams of hydrocarbon polymer were heated to 160–170° C. and 25 grams of styrene were added slowly under reflux. The temperature was then increased to 250° C. and a pinch of benzoyl peroxide was added. The polymerization was then completed at 250° C. The product obtained was a soft, resinous solid, which was however somewhat harder than the product obtained in the preceding run of this example.

This example shows that products obtained using styrene for polymerization with the hydrocarbon polymer are generally similar to those obtained using vinyl toluene for such polymerization.

The invention claimed is:

1. As a new composition of matter, the polymerization product of 5 to 95 parts by weight of a vinyl aromatic compound with 5 to 95 parts by weight of petroleum hydrocarbon polymer obtained by treatment of cracked gasoline with clay.

2. Composition according to claim 1 wherein said polymer has bromine number within the approximate range from 50 to 135.

3. Composition according to claim 1 wherein said polymer contains aromatic and non-aromatic rings and at least one olefinic double bond per molecule.

4. As a new composition of matter, a varnish comprising: the polymerization product of 5 to 95 parts by weight of a vinyl aromatic compound with 5 to 95 parts by weight of hydrocarbon polymer obtained by treatment of cracked gasoline with clay; a drier, and a solvent.

5. As a new composition of matter, an aluminum paint comprising: the polymerization product of 5 to 95 parts by weight of a vinyl aromatic compound with 5 to 95 parts by weight of hydrocarbon polymer obtained by treatment of cracked gasoline with clay; a drier; a solvent; and aluminum powder.

6. As a new composition of matter, the polymerization product of (1) 5 to 95 parts by weight of petroleum hydrocarbon polymer obtained by treatment of cracked gasoline with clay, and (2) 5 to 95 parts by weight of a vinyl aromatic compound having the formula:

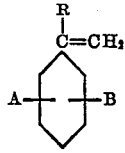

where R is selected from the group consisting of hydrogen, methyl and ethyl, and A and B are each selected from the group consisting of hydrogen, halogen and alkyl radicals having not more than three carbon atoms.

7. As a new composition of matter, a varnish comprising: the polymerization product of (1) 5 to 95 parts by weight of petroleum hydrocarbon polymer obtained by treatment of cracked gasoline with clay, and (2) 5 to 95 parts by weight of a vinyl aromatic compound having the following formula:

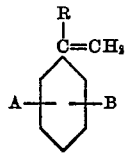

where R is selected from the group consisting of hydrogen, methyl and ethyl, and A and B are each selected from the group consisting of hydrogen, halogen and alkyl radicals having not more than three carbon atoms; a drier; and a solvent.

8. As a new composition of matter, an aluminum paint comprising: the polymerization product of (1) 5 to 95 parts by weight of petroleum hydrocarbon polymer obtained by treatment of cracked gasoline with clay, and (2) 5 to 95 parts by weight of a vinyl aromatic compound having the formula:

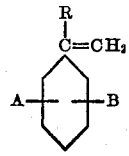

where R is selected from the group consisting of hydrogen, methyl and ethyl, and A and B are each selected from the group consisting of hydrogen, halogen and alkyl radicals having not more than three carbon atoms; a drier, a solvent; and aluminum powder.

9. As a new composition of matter, the polymerization product of 5 to 95 parts by weight of a vinyl aromatic hydrocarbon with 5 to 95 parts by weight of petroleum hydrocarbon polymer obtained by treatment of cracked gasoline with clay.

10. As a new composition of matter, a varnish comprising: the polymerization product of 5 to 95 parts by weight of a vinyl aromatic hydrocarbon with 5 to 95 parts by weight of petroleum hydrocarbon polymer obtained by treatment of cracked gasoline with clay; a drier; and a solvent.

11. As a new composition of matter, an aluminum paint comprising: the polymerization product of 5 to 95 parts by weight of a vinyl aromatic hydrocarbon with 5 to 95 parts by weight of petroleum hydrocarbon polymer obtained by treatment of cracked gasoline with clay; a drier; a solvent; and aluminum powder.

12. Composition according to claim 6 wherein said vinyl aromatic compound is styrene.

13. Composition according to claim 6 wherein said vinyl aromatic compound is vinyl toluene.

No references cited.